US007296868B2

(12) United States Patent
Shibata et al.

(10) Patent No.: US 7,296,868 B2
(45) Date of Patent: Nov. 20, 2007

(54) INK JET PRINTING SYSTEM

(75) Inventors: Tsuyoshi Shibata, Yokohama (JP); Takashi Ochiai, Tokyo (JP); Eri Noguchi, Yokohama (JP); Hiromitsu Yamaguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/443,032

(22) Filed: May 31, 2006

(65) Prior Publication Data

US 2006/0274098 A1 Dec. 7, 2006

(30) Foreign Application Priority Data

Jun. 7, 2005 (JP) ............................ 2005-167408

(51) Int. Cl.
*B41J 2/205* (2006.01)
*G06F 15/00* (2006.01)

(52) U.S. Cl. ............................ 347/15; 347/9; 358/1.9

(58) Field of Classification Search .................... 347/9, 347/15, 43, 14, 5, 12; 358/1.2, 1.9, 3.23
See application file for complete search history.

(56) References Cited

U.S. PATENT DOCUMENTS 5,369,428 A * 11/1994 Maze et al. .................... 347/5
6,533,382 B1 3/2003 Tomida et al.
6,554,396 B1 4/2003 Mizutani
6,612,678 B2 9/2003 Kato et al.
6,666,535 B2 * 12/2003 Xie et al. ...................... 347/5
2006/0109291 A1 * 5/2006 De Pena et al. .............. 347/12
2006/0119632 A1 6/2006 Ochiai et al.
2006/0119660 A1 6/2006 Ochiai et al.

FOREIGN PATENT DOCUMENTS

| | | |
|---|---|---|
| JP | 6-135126 | 5/1994 |
| JP | 7-304216 | 11/1995 |
| JP | 2001-129981 | 5/2001 |
| JP | 2002-86764 | 3/2002 |
| JP | 2002-144608 | 5/2002 |

* cited by examiner

*Primary Examiner*—Lamson Nguyen
(74) *Attorney, Agent, or Firm*—Fitzpatrick, Cella, Harper & Scinto

(57) ABSTRACT

In an ink jet printing apparatus in which satellites are produced, it is an object to minimize image impairments caused by the satellites in a variety of print modes. To this end, index patterns are prepared which have different sizes for different print modes. This enables satellites to land at print positions of main dots in other pixels in any of the print modes that have different distances between main dots and satellites. It is therefore possible to minimize image impairments caused by the satellites and to output a crisp image.

7 Claims, 17 Drawing Sheets

INK JET PRINTING SYSTEM

BACKGROUND OF THE INVENTION

1. Field of the Invention

The present invention relates to an ink jet printing system which forms an image by arranging dots on a print medium by using a print head that ejects ink in the form of droplets according to image data. More particularly, the present invention relates to a dot control method for preventing possible image impairments on the print medium caused by ejected ink droplets separating into main droplets and satellites.

2. Description of the Related Art

As information processing devices, such as copying machines, word processors and computers, and communication devices are coming into wider use, an ink jet printing apparatus has come to be known as one of output devices to print an image (information) generated by these devices. The ink jet printing apparatus forms an image by applying ink to a print medium. More specifically, the ink jet printing apparatus uses a print head having a plurality of integrated printing elements (also referred to as nozzles), each comprised of an ink ejection opening and an ink path to supply ink to the opening, and ejects ink from the printing elements according to a print signal. Further, a growing number of ink jet printing apparatus with a plurality of such print heads that can meet the requirements of color printing are coming into the market.

The ink jet printing system ejects an ink or recording liquid in the form of flying droplets onto a print medium, such as paper, to form dots on it. This system, since it is of a non-contact type, has an advantage of low noise. By increasing a density of ink ejection nozzles, a resolution of an image can be enhanced and a high speed printing realized. This printing system can also produce a high quality image on such print mediums as plain paper at relatively low cost without requiring any special processing such as development and fixing. An on-demand type ink jet printing apparatus in particular is considered promising because it can easily be upgraded to have a color printing capability and reduced in size and complexity.

In such an ink jet printing apparatus, there are growing demands in recent years for faster printing speed and higher image quality. To meet these demands, the nozzle integration technology has achieved a rapid advance and many long print heads with high densities of nozzles are available on the market. As the density of nozzles increases, a technology to reduce an amount of ink ejected from individual nozzles is also being developed. Further, a printing apparatus is also available which provides an improved greyscale of image by adopting a technique for ejecting multiple sizes of ink droplets from each nozzle or a construction in which a plurality of nozzle columns are installed for each size of ink droplets to be ejected. To realize a faster printing speed, a technique has been developed that increases a frequency of ink ejection from the nozzles and moves the print head mounting carriage at a correspondingly faster speed.

When the ejection state of individual nozzles in the ink jet print head becomes unstable, it is generally known that an ink droplet ejected in one ejection operation separates into a main droplet and a smaller sub droplet. Since the main and sub droplets have different flying speeds, these two droplets that are ejected as the carriage moves land on different positions on a print medium. In the following description, dots formed by the main droplets are called main dots and those formed by sub droplets satellites. If satellites show too distinctively, dots are recognized at positions unrelated to image data, which may lead to an image problem. There are cases, however, where such satellites do not pose a problem if they are sufficiently small compared with the main dots or land very close to the main dots.

To cope with the problem of satellites, various methods have been proposed which include, for example, one that limits the nozzles used during reciprocal printing scans and one that uses different nozzles than those used for an outline portion of characters and figures where image impairments caused by satellites easily show. These techniques are disclosed, for example, in Japanese Patent Application Laid-open Nos. 06-135126, 2001-129981, 2002-086764, 2002-144608 and 07-304216.

It is noted, however, that an effort in recent years to reduce the size of ink droplets, though it has an effect of reducing the size of main droplets and minimizing the graininess of a printed image, can undesirably enhance the presence of the satellites. Further, increasing the traveling speed of the carriage for faster printing can pull farther apart the landing positions of the main and sub droplets that fly at different speeds, undesirably making the satellites more noticeable. The presence of satellites at positions unrelated to the image data can change the grayscale of an image, making the grayscale representation unstable. That is, as the image quality required of the ink jet printing apparatus goes higher and higher, the presence of the satellites and their adverse effects on the image are becoming an increasingly serious issue.

Especially, in a printing apparatus having a plurality of printing modes, a traveling speed of the carriage, a distance between an ink ejection face of the print head and a print medium (referred to simply as "distance to the paper"), or an ink ejection volume may vary from one mode to another. In this case, the distance between the main dot and the satellite is also unstable, which may cause image impairments to show depending on the print mode.

SUMMARY OF THE INVENTION

The present invention has been accomplished to eliminate the problem described above. That is, in an ink jet printing apparatus in which ink satellites are produced, this invention can minimize image impairments caused by satellites in a variety of printing modes.

An aspect of the present invention is an ink jet printing system which uses a print head having a plurality of ink ejecting nozzles to form an image on a print medium that is moved relative to the print head; the ink jet printing system comprising: means for setting one of plurality of print modes; means for converting multivalued image data into grayscale data of a predetermined resolution and level according to the set print mode; means for selecting one of index patterns according to the print mode and the grayscale data, each of the index patterns having a plurality of sectioned areas corresponding to one pixel of a printing resolution of the print head, the areas being arrayed in at least the direction of relative movement, and predetermined print/non-print binary data being set in each of the sectioned areas to represent a density in an area corresponding to one pixel of the predetermined resolution; and means for ejecting ink from the nozzles toward the print medium according to the index pattern selected by the selection means; wherein the ink ejected from the nozzles is divided into a main droplet and a sub droplet following the main droplet; wherein the number of sectioned areas arrayed in the index pattern in the direction of relative movement is so determined that the main droplet and the sub droplet land on the print medium, spaced a distance almost equal to an integer times a width, in the direction of relative movement, of the area corresponding to one pixel of the predetermined resolution.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Now, one embodiment of this invention will be described by referring to the accompanying drawings.

Figure 1:
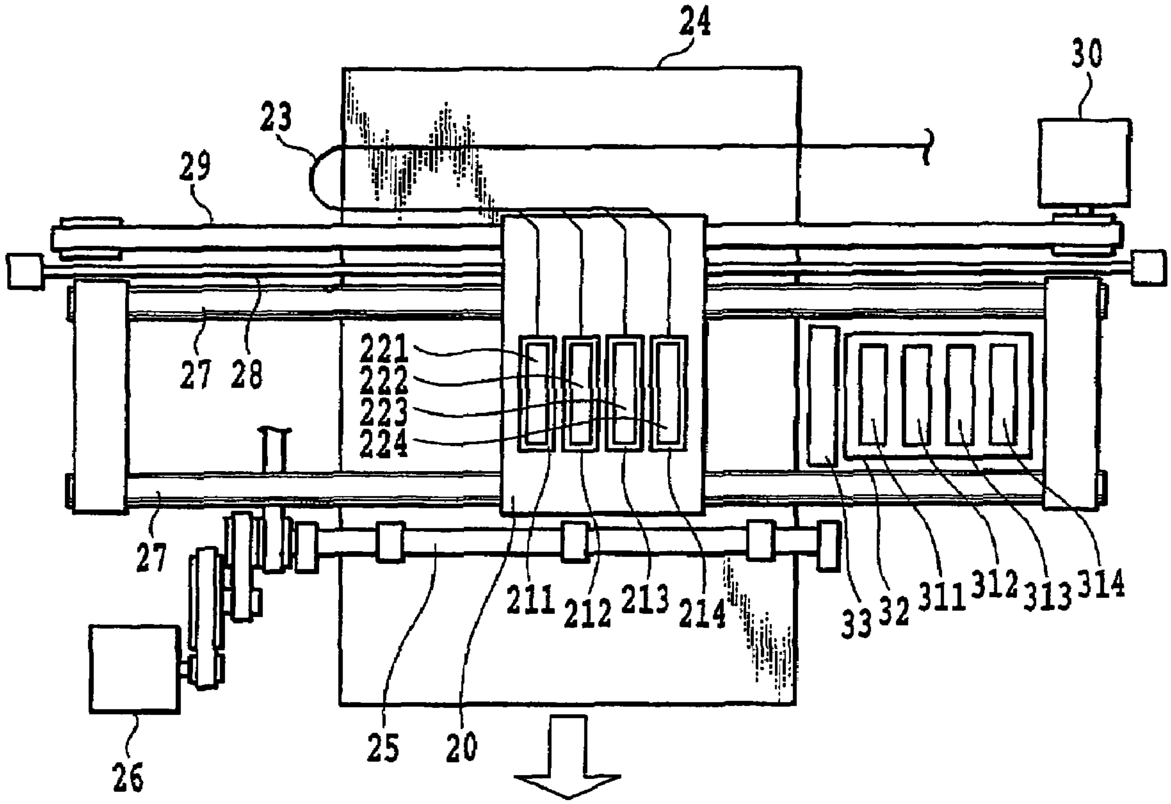
FIG. 1 is a top view showing an outline construction of an ink jet printing apparatus that can be applied to an embodiment of this invention.

FIG. 1 is a top view showing an outline construction of an ink jet printing apparatus as one embodiment of this invention. A print medium 24, such as plain paper, high-quality dedicated paper, OHP sheet, glossy paper, glossy film and postcard, is fed through transport rollers not shown and held between discharge rollers 25 which, driven by a transport motor 26, feed the print medium in the direction of arrow (subscan direction). A carriage 20 is reciprocally moved laterally in a main scan direction by a carriage motor 30 through a drive belt 29. The carriage 20 is guided along a guide shaft 27 in the main scan direction and controlled in its travel position by a linear encoder 28.

The carriage 20 has mounted thereon four ink jet print heads (also referred to simply as print heads) 211-214, which correspond to four color inks of black (K), cyan (C), magenta (M) and yellow (Y). Each print head 211-214 has an array of ink ejecting print elements (nozzles). Each of these nozzles has a liquid path in which an electrothermal transducer (heater) is installed to produce a thermal energy to eject ink from the nozzle. A print signal is transferred to the print heads 211-214 through a flexible cable and the nozzles in the print heads eject ink at a read timing of the linear encoder 28 according to the print signal received. Denoted 221-224 are ink cartridges for accommodating and supplying inks to the associated print heads 211-214.

That is, the ink jet printing apparatus of this invention forms an image by alternating a printing operation performed by the print heads 211-214 as they travel in the main scan direction and a transport operation which feeds the print medium in the direction of arrow.

At a home position outside the print area of the print heads 211-214, a recovery unit 32 is installed which has caps 311-314 to cover the print heads 211-214. When the print heads 211-214 are at rest, the carriage 20 is moved to the home position where their nozzle openings are hermetically covered with the caps 311-314. These caps can minimize evaporation of ink solvent from the nozzle openings and prevent clogging of nozzles due to solidified ink or foreign substances such as dust adhering to the openings and their surroundings. The caps 311-314 are also used to receive ink that is ejected, but not based on the image data, for preventing ejection failures and clogging of those nozzles with low ejection frequencies. Further, activating a pump not shown, with the print heads capped, can suck out ink from the nozzle openings and thereby recover the ejection performance of the failed nozzles.

Denoted 33 is an ink receiver to receive ink that the print heads 211-214 eject as they move over the ink receiver 33 immediately before the printing scan. Though not shown, it is also possible to install a blade or other wiping member at a position adjoining the caps to clean nozzle surfaces of the print heads 211-214.

Figure 2:
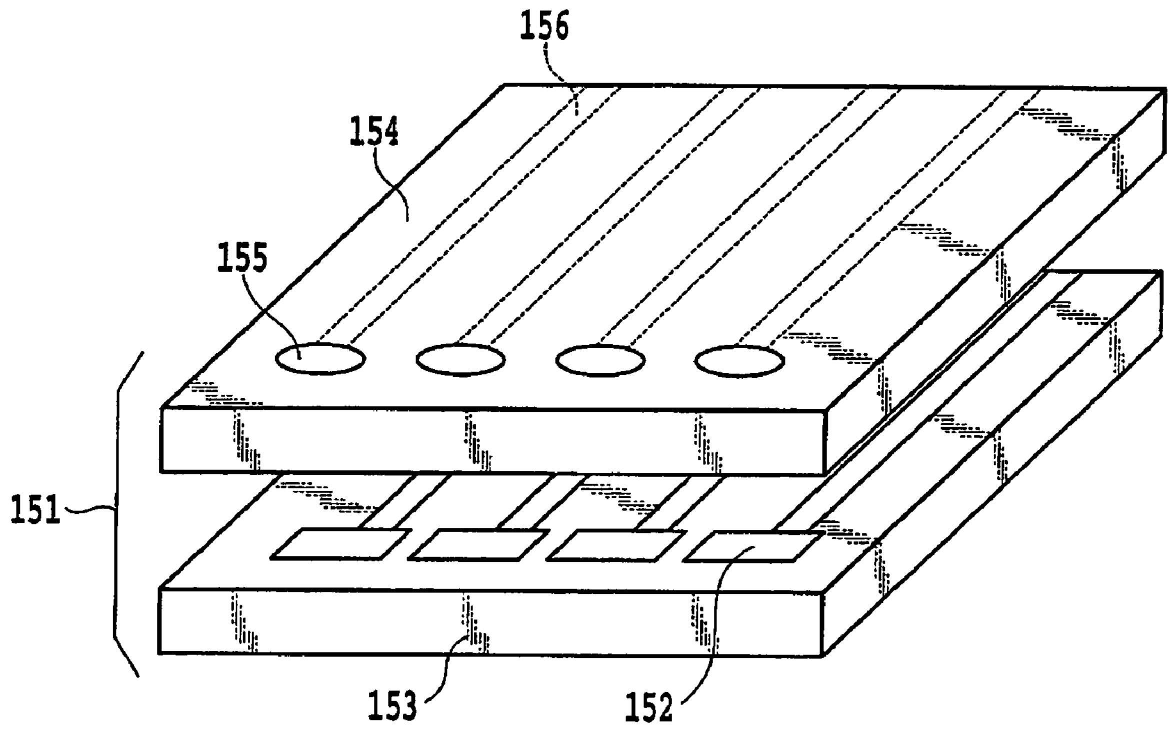
FIG. 2 is an enlarged view showing a structure of a print head used in the embodiment of this invention.

FIG. 2 is an enlarged view showing a construction of a print head applied in this embodiment. The print head 151 largely comprises a heater board 153 formed with a plurality of electrothermal transducers (heaters) 152 for heating ink and a top plate 154 disposed over the heater board 153. The top plate 154 is formed with a plurality of nozzle openings 155 at positions corresponding to the individual heaters 152 in the heater board 153 and also with tunnel-like ink paths 156 extending rearward from, and communicating with, the associated nozzle openings 155. Further, the ink paths 156 are commonly connected to one ink chamber on a rear side of the top plate. The ink chamber is supplied a color ink from an ink tank of the corresponding color through an ink supply port. When a voltage is applied to the heater 152 according to the print signal, the heater is rapidly heated to produce a bubble in the ink that is in contact with the heater. The bubble generation energy expels a predetermined volume of ink droplet from the nozzle opening 155. Although only four nozzles are shown here, the actual heater board and the top plate 154 are formed with many nozzles in the similar manner.

It is noted that the ink jet printing system applicable to this invention is not limited to the one using the electrothermal transducers (heaters) shown here. For example, it is possible to employ a pressure control system that ejects ink droplets from orifices by mechanical vibrations of piezoelectric elements.

Figure 3:
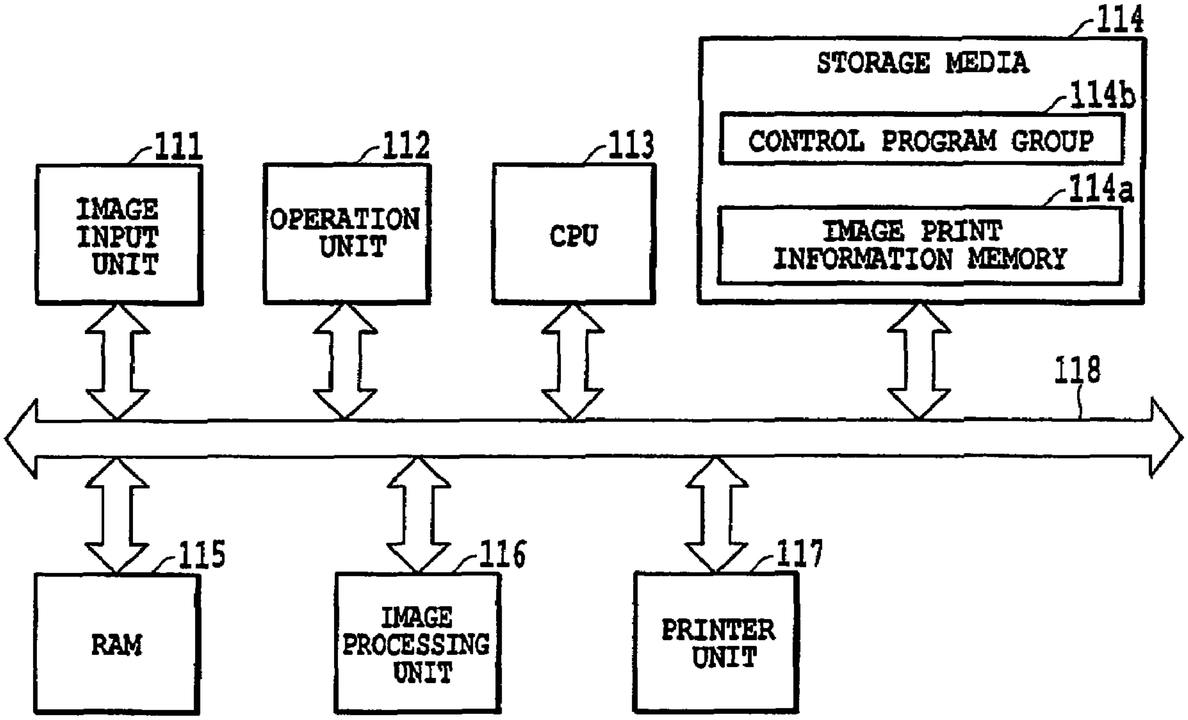
FIG. 3 is a block diagram showing a configuration of a control system for a printing system including the ink jet printing apparatus applicable to this invention.

FIG. 3 is a block diagram showing a control system configuration for a printing system including the ink jet printing apparatus shown in FIG. 1. In the figure, denoted 111 is an image input unit. The image input unit 111 receives multivalued image data from image input devices such as scanner and digital camera and multivalued image data stored in a hard disk drive of a personal computer and supplies them to the printing apparatus. Designated 112 is an operation unit having various keys for setting parameters and starting the printing operation. A CPU 113 performs an overall control on the printing apparatus according to programs stored in a storage medium 114.

The storage medium 114 includes an image print information memory 114*a* that stores such information as landing position, kind of print medium, ink and environment including temperature and humidity, and a control program group 114*b* storing various control programs for the printing apparatus. The storage medium 114 may be ROM, FD, CD-ROM, HD, memory card and magnetooptical disk.

Designated 115 is a RAM which is used as a work area when programs stored in the storage medium 114 are executed and also as a temporary save area during error processing and as a work area during image processing. The RAM 115 can also be used when the image processing is performed by an image processing unit 116 temporarily copying various tables stored in the storage medium 114 and changing the contents of the tables.

Designated 116 is an image processing unit. The image processing unit 116 performs a series of image processing steps to convert a multivalued image signal received by the image input unit 111 into binary print data that the printing elements (nozzles) of the printer unit 117 can print. Details of the image processing executed by the image processing unit 116 will be described later.

Denoted 117 is a printer unit or printing apparatus explained by referring to FIG. 1. The printer unit 117 ejects ink from the print heads of various colors according to binary print data generated by the image processing unit 116 to form dots on a print medium. Denoted 118 is a bus line to transmit information in this system such as address signal, data and control signal.

Figure 4:
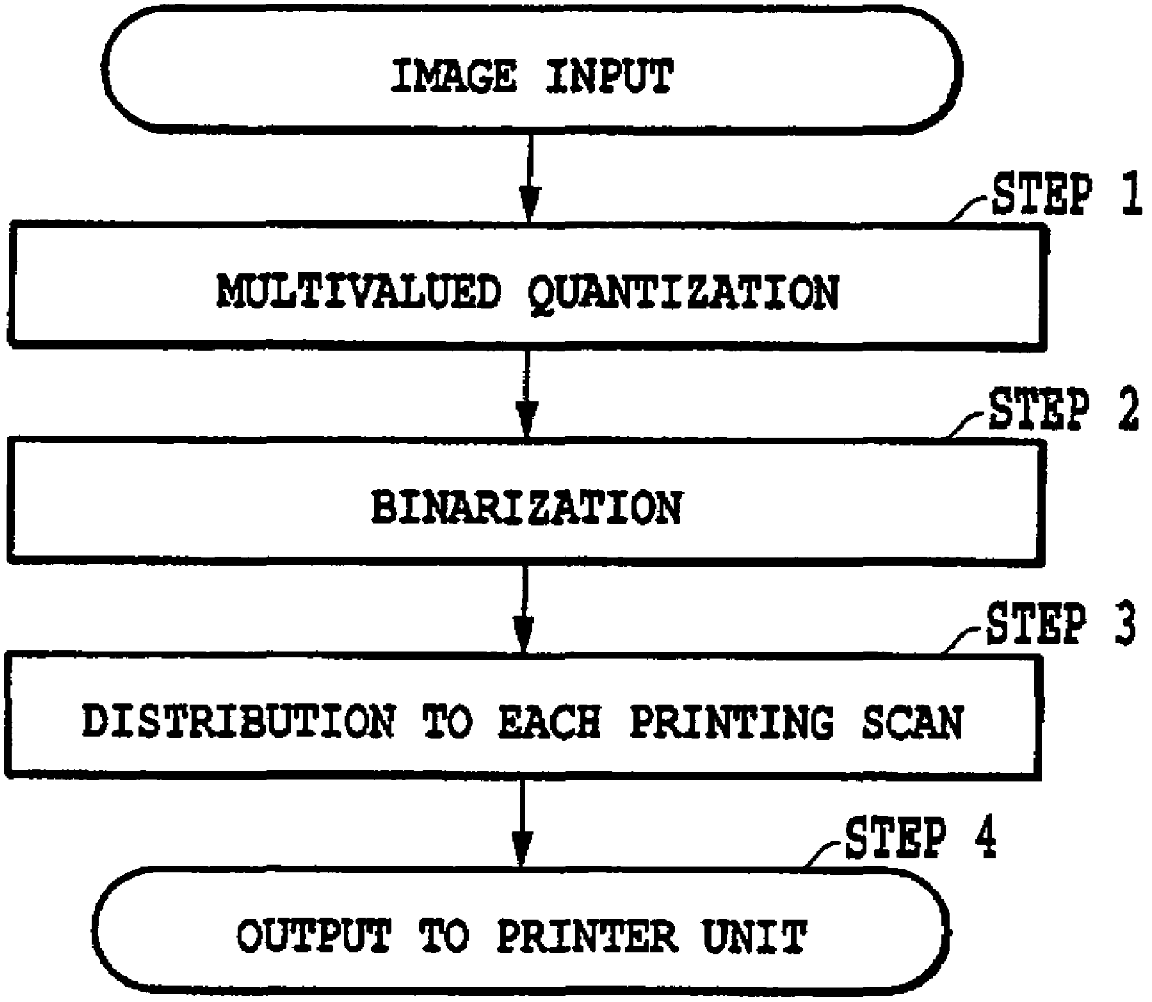
FIG. 4 is a flow chart showing image processing.

FIG. 4 is a flow chart showing a sequence of steps during the image processing executed by the image processing unit 116. The image input unit 111 of this embodiment receives an 8-bit signal having 256-level grayscale information for each pixel at a predetermined resolution. The predetermined resolution is corresponding to a size of a pixel which is a unit of tone reproduction. The image processing unit 116 converts the 256-valued signal into a density signal K with N grayscale levels, fewer than the 256 levels, at a resolution of 300 ppi (pixels/inch) (step 1). The conversion method may include a multivalued error diffusion method and any half tone processing method, such as a minimizing average error method and a dither matrix method. After having converted image data for each pixel into N-grayscale density signal K, the image processing unit 116 references tables in the image print information memory 114*a* to further convert the density signal K into an 8×8-subpixel index pattern corresponding to the density value K (step 2).

Figure 5:
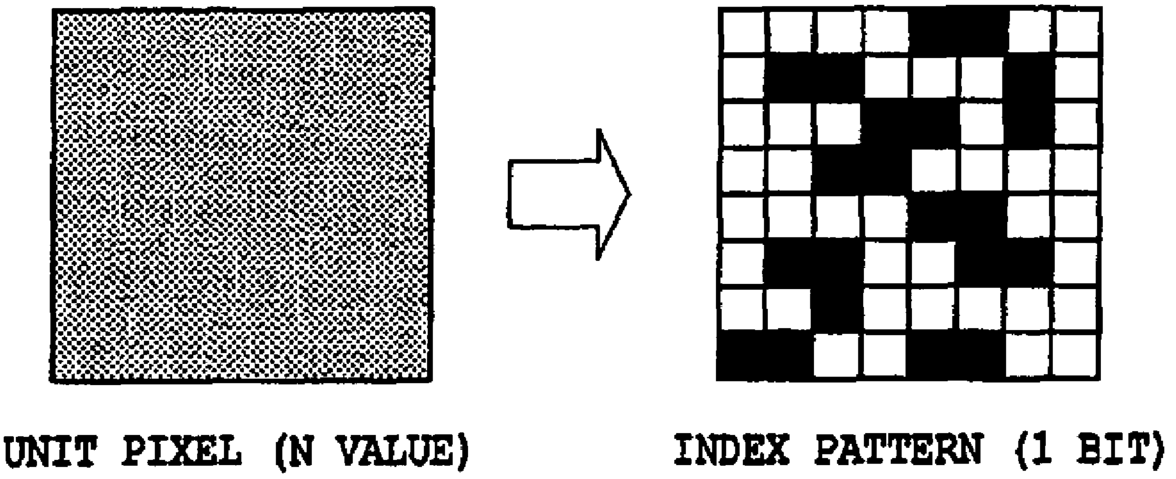
FIG. 5 is a schematic diagram showing an example conversion of an index pattern.

FIG. 5 is a schematic diagram showing an example of index pattern conversion. Each sectioned area or subpixel in the 8×8 subpixels shown to the right is an area in which one dot can be printed by each print head at a printing resolution of 2400 dpi (dots/inch). The index pattern is a binary pattern of areas to be printed with dots (black areas) and areas not to be printed with dots (white areas), according to the density value K among 64 grayscale levels. For example, when the same grayscale values K continue, similar dot arrangements based on the same index pattern occur continuously.

With the binary print data compatible with the printing resolution of the printer unit generated, the image processing unit 116 performs an AND logic operation on the binary print data and a mask pattern to determine final binary data for the print head to eject ink during the next printing scan (step 3).

The final binary data thus determined is transferred to the printer unit (step 4).

Next, experiments that the inventors of this invention conducted using the ink jet printing system described above will be explained. The inventors of this invention generated satellites, the problem to be resolved by this invention, by changing conditions.

Figure 6:
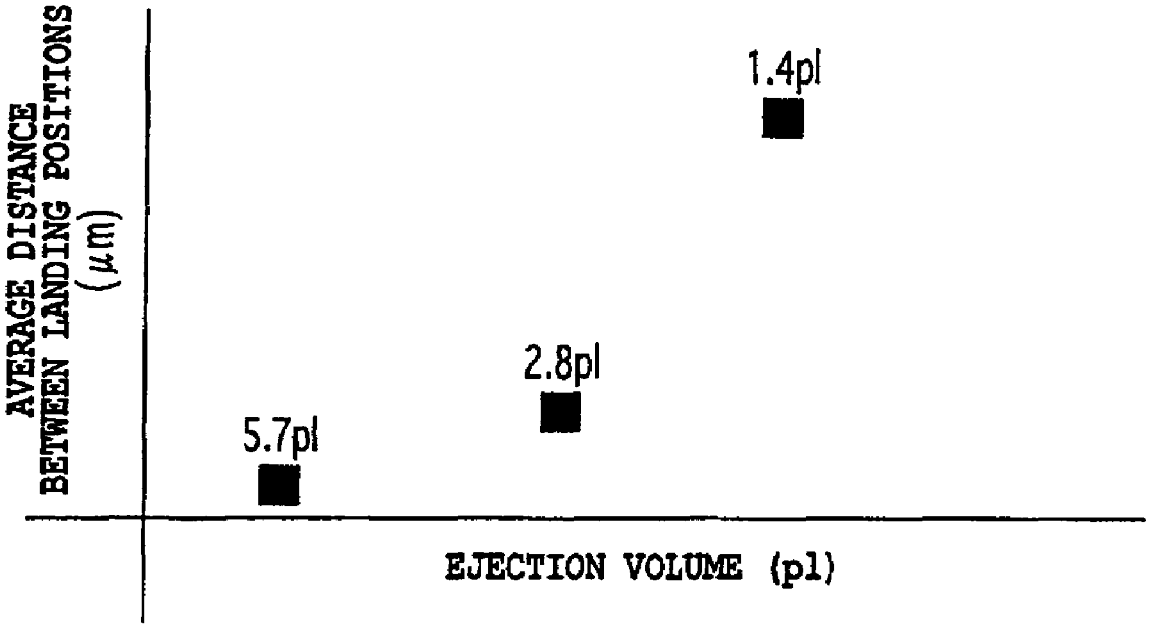
FIG. 6 is a graph showing a relation between a main droplet volume and a distance between landing positions of main dot and satellite.

FIG. 6 shows a relation between the volume of a main droplet ejected and a landing position distance between the main dot and the satellite. In this examination, with the carriage travel speed fixed at 25 inches/sec and the distance between the nozzle face of the print head and the print medium fixed at 1.5 mm, dots were formed on the print medium by using three ink volumes of 5.7 pl, 2.8 pl and 1.4 pl. At this time, an average distance between dots formed by satellite and main dot was determined and plotted for each ink volume. In the graph, an abscissa represents an ink volume which is shown to decrease toward right. An ordinate represents an average of distance between main dot and satellite. The graph indicates that the smaller the ink volume ejected, the greater the average distance between main dot and satellite.

Figure 7:
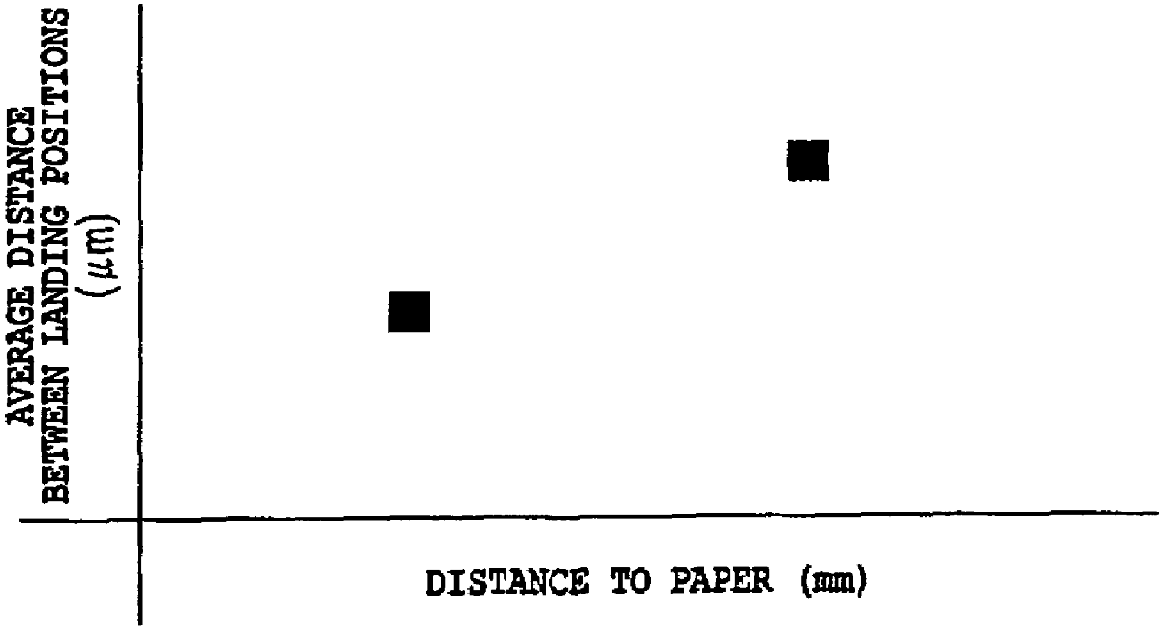
FIG. 7 is a graph showing a relation between a distance to paper and a distance between landing positions of main dot and satellite, with a traveling speed of the carriage and an ink ejection volume fixed.

FIG. 7 shows a relation between the distance to paper and the landing position distance between main dot and satellite, with the carriage travel speed and the ejection volume fixed. The graph shows that the larger the distance to paper, the greater the average distance between main dot and satellite will be. Although the main droplet and sub droplet have almost the same speed component in the direction of carriage movement at time of ejection, it is known that the main droplet has a larger speed component toward the print medium. Hence, the greater the distance to paper, the larger their landing time difference and landing position distance in the direction of carriage movement.

Figure 8:
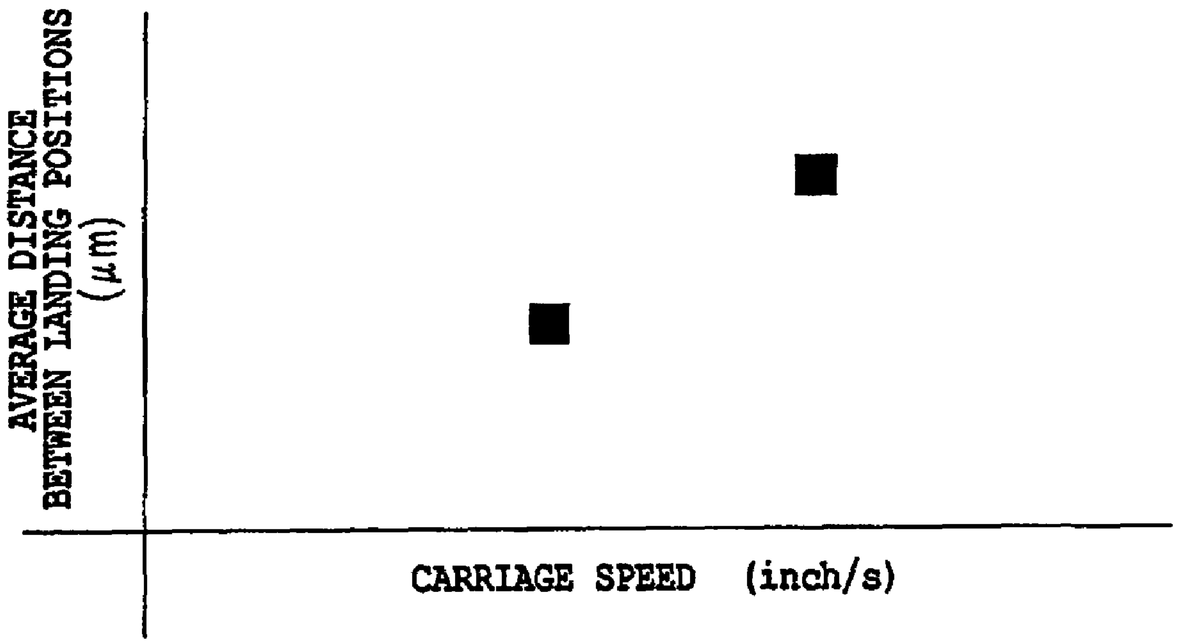
FIG. 8 is a graph showing a relation between a traveling speed of the carriage and a distance between landing positions of main dot and satellite, with a distance to paper and an ink ejection volume fixed.

FIG. 8 shows a relation between the travel speed of the carriage and the landing position distance between main dot and satellite, with the distance to paper and the ejection volume fixed. The graph shows that the faster the travel speed of the carriage, the larger the average distance between main dot and satellite. As in the case of FIG. 7, since the main droplet and sub droplet have different speed components toward the print medium, as the carriage speed increases, their landing position distance in the direction of carriage movement widens.

Figure 9:
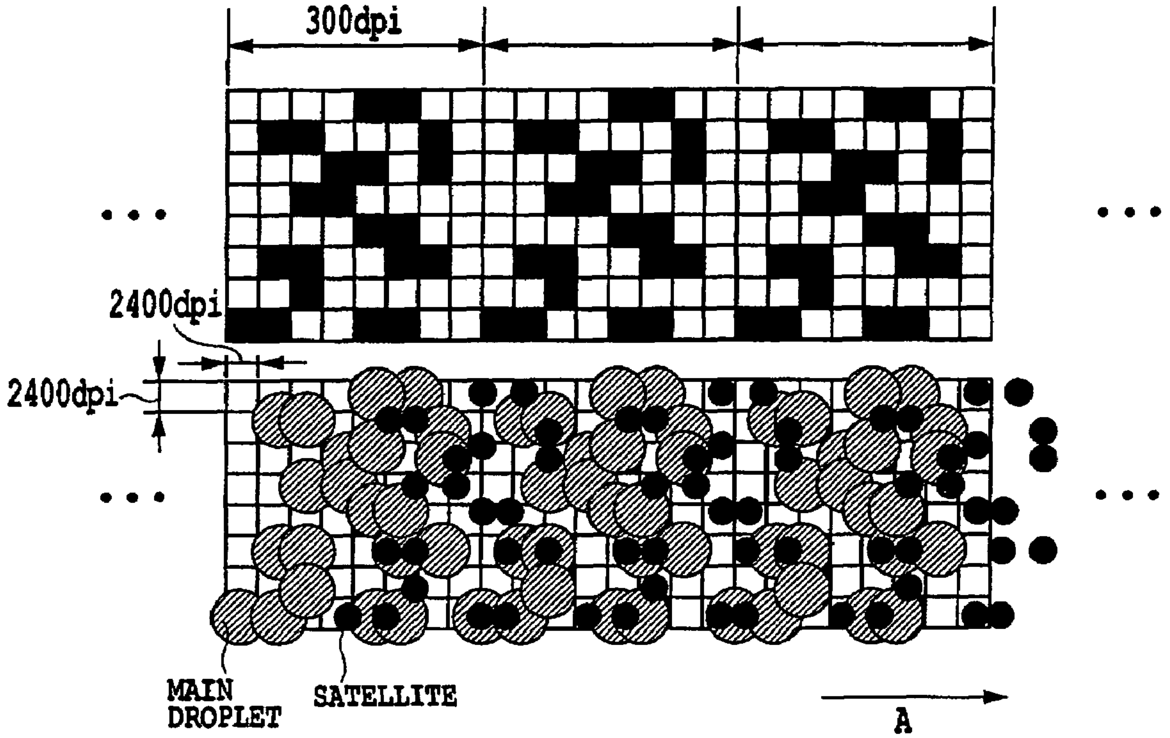
FIG. 9 is a schematic diagram showing a landing state of dots scattered with satellites, when a predetermined index pattern is printed continuously.

FIG. 9 is a schematic diagram showing how main dots and satellites are formed when an index pattern such as shown in FIG. 5 is printed in succession. In the figure, the density of the sectioned areas or subpixels is 2,400 dpi, i.e., a single area is about 10.6 μm square. The carriage moves in the direction of arrow A and the sub droplets, which land late on the print medium, land at positions shifted in the direction A from the landing positions of the associated main droplets. The printed dot pattern shown here represents a case where the distance between the main dot and the satellite was about 32 μm.

When the satellites land greatly shifted from the associated main dots, there is a possibility of satellite dots being formed in white areas that are not supposed to be printed. Since the dots formed by satellites are not negligibly small compared with the main dots, the actual density value represented by each pixel (8×8-subpixel area) may differ from the intended grayscale value K. Further, because an outline of the image that is supposed to be formed by the main dots become difficult to define clearly, the printed image may be less sharp. Another problem is that the landing positions and sizes of satellites are easily affected by vibrations of the carriage and the ejection performance of the print head during the printing operation. Therefore, the grayscale value may vary from one printing operation to another and the printed image may give granular impression and produce stripe-like image impairments unexpectedly, making the output image very unstable.

Examinations by the inventors of this invention have found that the satellites, if the amount of their shift with respect to the main dots meets a predetermined condition, do not affect the image quality so much. More specifically, if the average distance between the main dots and satellites is an integer times the width of the index pattern in the main scan direction, this resembles a situation where the main dots and satellites land close to each other, thus reducing the above-described undesirable effects on the image.

For example, in the case of FIG. 9, the index pattern has a main scan direction width of eight subpixels or about 85 μm. Let us consider a case where the index pattern width is set to about 32 μm, the average distance between main dots and satellites. In this case, the satellites that deviate from the associated main dots are very likely to overlap main dots of an adjoining index pattern, minimizing image impairments that would otherwise be caused by the satellites landing on white areas.

Figure 10A:
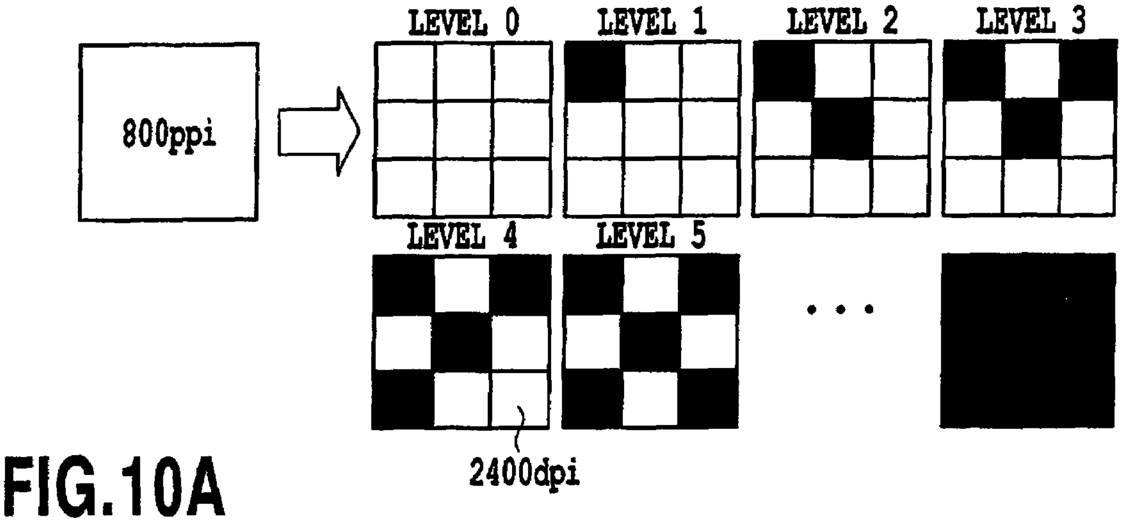
FIGS. 10A to 10C are schematic diagrams showing index patterns and landing dots.
Figure 10B:
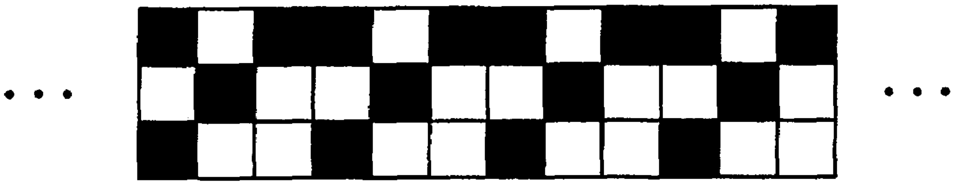
Figure 10C:
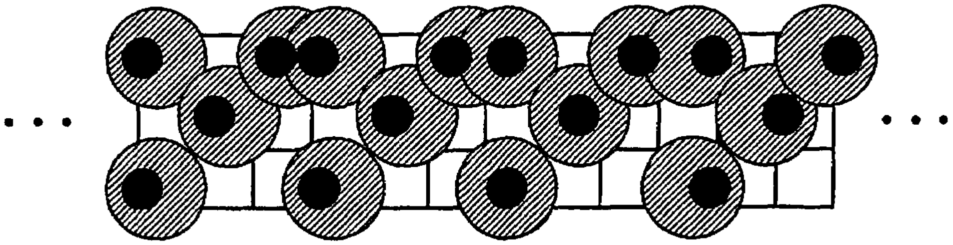

FIGS. 10A to 10C are schematic diagrams showing index patterns and dots formed when the width of index patterns is set to 32 μm. Where the index patterns of FIG. 10A are applied, the image processing unit 116 in step 1 converts 256-valued image data received at the pixel resolution of 300 ppi into 10-valued data at 800 ppi. In step 2, the image processing unit 116 converts the multivalued data obtained in step 1 into binary data for each of 3×3 subpixels, which indicates whether or not individual 3×3 subpixels are to be printed.

FIG. 10A shows example index patterns of a 3×3 subpixel area representing 10 grayscale levels (0-9) of one pixel at a resolution of 800 ppi. As the level increases, the number of subpixels in one pixel to be printed increases by one subpixel at a time.

FIG. 10B show an example arrangement of index patterns when pixels with a grayscale level of 4 occur continuously. When a certain level of density spreads uniformly, a fixed index pattern is repeated continuously in this way.

FIG. 10C shows dots actually printed according to the index patterns of FIG. 10B. Satellites land deviated about 32 μm away from main dots as in FIG. 9. But these satellite landing positions match the positions where main dots of the adjoining pixel are formed, so the satellites of the preceding pixel overlap the main dots of the next pixel. Since the satellites do not land on areas that are supposed to be blank, as they did in FIG. 9, many problems accompanied by the satellites are expected to be alleviated.

Normally, the ink jet printing system has a plurality of print modes with different carriage speeds, different distances to paper or different ejection volumes according to image quality and use. For example, in a high speed print mode for outputting an image in a short time, the carriage speed is set higher than normal. When a print medium is en envelope or thick paper, the distance to paper is set larger than normal to keep the print medium and the print head out of contact. In these cases, as explained in connection with FIG. 6 to FIG. 8, a situation arises where the average distance between main dots and satellites varies when different print modes are used.

In the embodiment of this invention, it is assumed that average distances between main dots and satellites that were measured experimentally for different print modes are stored in advance in the memory of the printing apparatus. Since the average distance is likely to vary according to the environment and printing apparatus used, an optical sensing means to measure the average distance may be installed in the printing apparatus body.

Based on the result of the above examinations, an embodiment of this invention will be described in detail.

Figure 11:
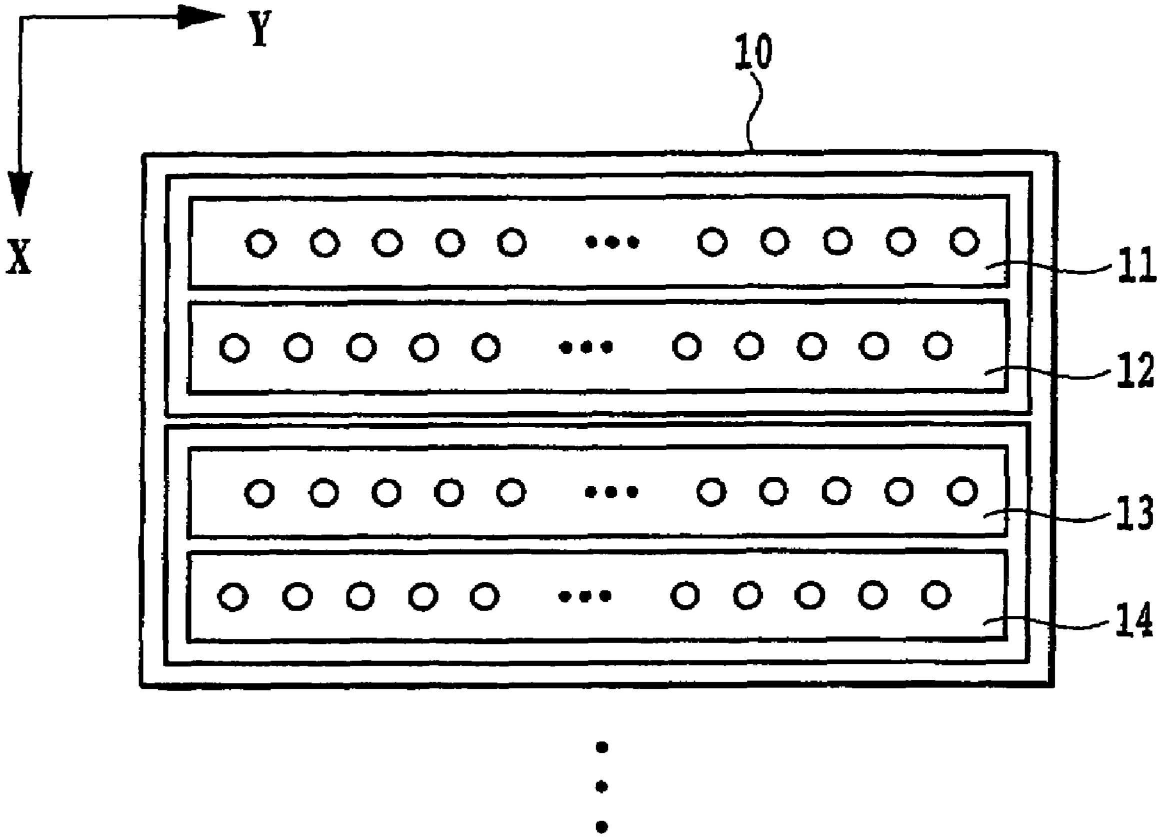
FIG. 11 is a schematic diagram showing an array of nozzles in the print head used in the embodiment of this invention.

FIG. 11 is a schematic diagram showing an ejection opening arrangement in the print head applied in this embodiment. In the figure, denoted 11-14 are columns of nozzles for ejecting ink droplets of a predetermined volume. Each nozzle column has 256 nozzles arrayed in a Y direction at a pitch of 600 dpi. These nozzle columns 11-14 are intended to eject the same color ink but are staggered ¼ pitch from each other in the Y direction. That is, ejecting ink from these nozzles as the print head 10 scans in the X direction can print 1024 dots in the Y direction at a 2400 dpi resolution.

Next, some of the print modes available in the printing apparatus of this embodiment will be explained. A first print mode has a print head ejection volume of 1.5 pl, a distance to paper of 1.0 mm and a carriage speed of 25 inches/sec. The average distance between main dots and satellites in this print mode is assumed to be 32 μm. In a second print mode the print head ejection volume is 1.5 pl, the distance to paper 1.5 mm, the carriage speed 25 inches/sec, and the average distance 62 μm. In a third print mode the print head ejection volume is 1.0 pl, the distance to paper 1.2 mm, the carriage speed 25 inches/sec, and the average distance 85 μm. In a fourth print mode the print head ejection volume is 1.2 pl, the distance to paper 1.0 mm, the carriage speed 25 inches/sec, and the average distance 85 μm.

The ink jet printing apparatus of this embodiment provides different index patterns for these four print modes.

Figure 12:
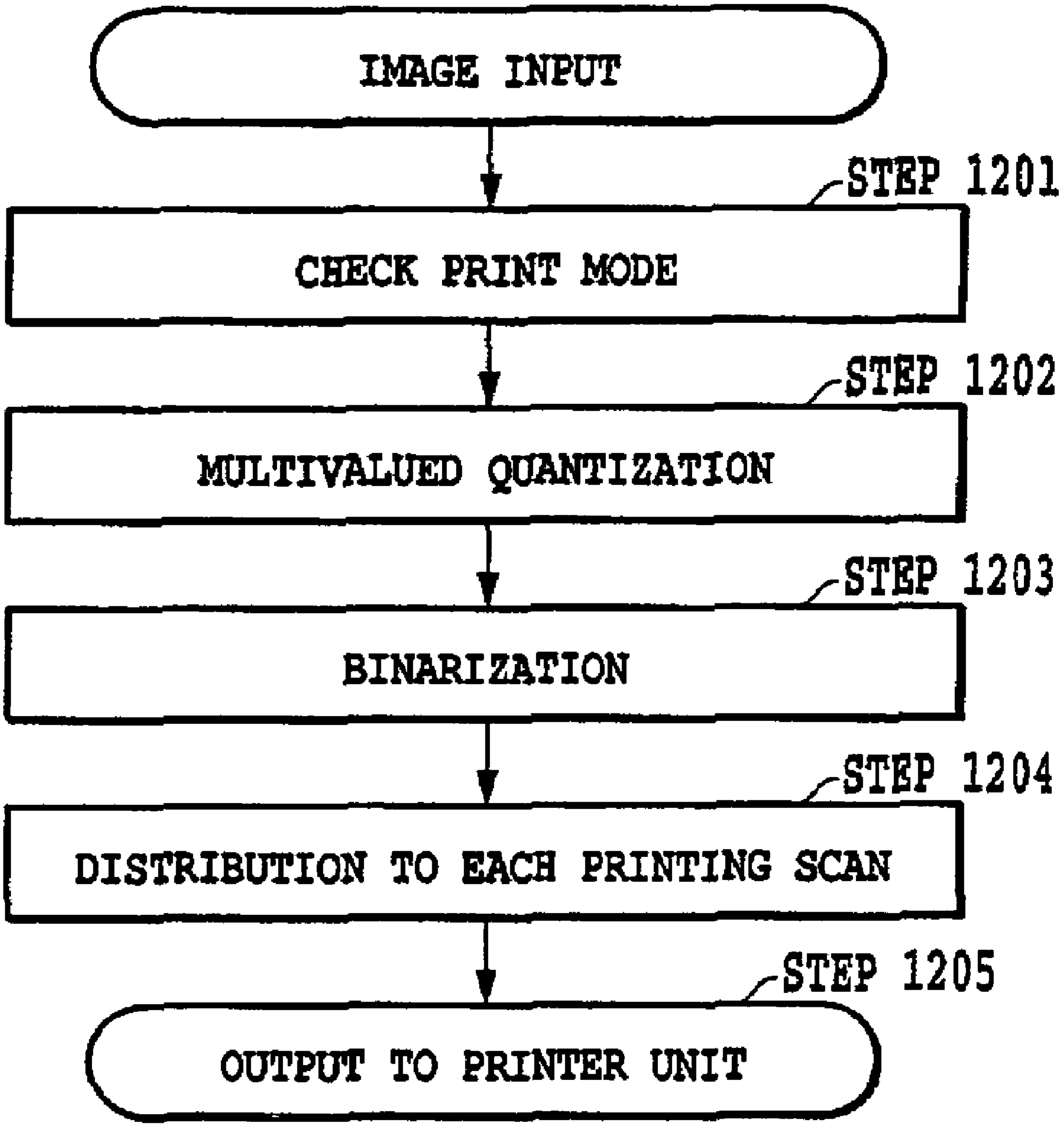
FIG. 12 is a flow chart showing image processing performed in the embodiment of this invention.

FIG. 12 is a flow chart showing a sequence of steps performed by the image processing in this embodiment. In step 1201 image data entered is checked for a print mode. With the print mode determined, processing associated with that print mode is executed independently in the following steps.

In step 1202, a multivalue quantization is executed according to the print mode selected. In the first print mode, 256-level grayscale data at a resolution of 300 ppi is quantized into 10-level grayscale data at 800 dpi. In the second print mode, the 256-level grayscale data is quantized into 37-level grayscale data at 400 dpi. In the third print mode, the 256-level grayscale data is quantized into 16-grayscale data at 600 dpi. Further, in the fourth print mode, the 256-level grayscale data is quantized into 64-level grayscale data at 300 dpi.

In the next step S1203, binary processing is executed according to the print mode selected. In the first mode, a data conversion is performed using a 3×3-subpixel index pattern, such as explained in FIG. 10A. In the second print mode, the data conversion is executed using a 6×6-subpixel index pattern. In the third print mode, the data conversion is executed using a 4×4-subpixel index pattern. In the fourth print mode, the data conversion is executed using an 8×8-subpixel index pattern.

In step 1204, dot data to be actually printed in each printing scan is determined. More specifically, the mask pattern prepared for each print mode and the binary pattern output by step 1203 are ANDed to determine final binary data, which is transferred to the printer unit (step 1205).

According to the construction and processing described above, in the first print mode for example, the use of the index pattern of FIG. 10B causes the satellites, that are formed about 32 μm away from main dots, to be printed over the main dots of the adjoining pixel, rendering the satellites hardly distinguishable (FIG. 10C). In this embodiment, such index patterns are prepared for different print modes to ensure that, in any print mode, the satellites deviated from the main dots will easily overlap the main dots of other pixels.

If it is attempted to cause the satellites to overlap the adjoining pixel, the index pattern may be required to have a significantly low frequency cycle, i.e., low resolution, depending on the carriage speed and the distance to paper. A reduction in resolution may lead to a degraded image quality and therefore this method is not so desirable depending on the image quality required. To produce the intended effect of this invention, the main dots that the satellites overlap do not need to be in the adjoining pixel. The only requirement is that the satellites overlap the main dots in any of the pixels so as to become hardly distinguishable. Therefore, in the third print mode that has a main dot-satellite distance of 85 μm, this embodiment uses a 600-dpi index pattern that is printed in a cycle of about 42.3 μm, instead of the 300-dpi index pattern. In this print mode, the satellites deviating from the main dots are printed over main dots of a pixel situated two pixels ahead in the main scan direction.

Figure 13A:
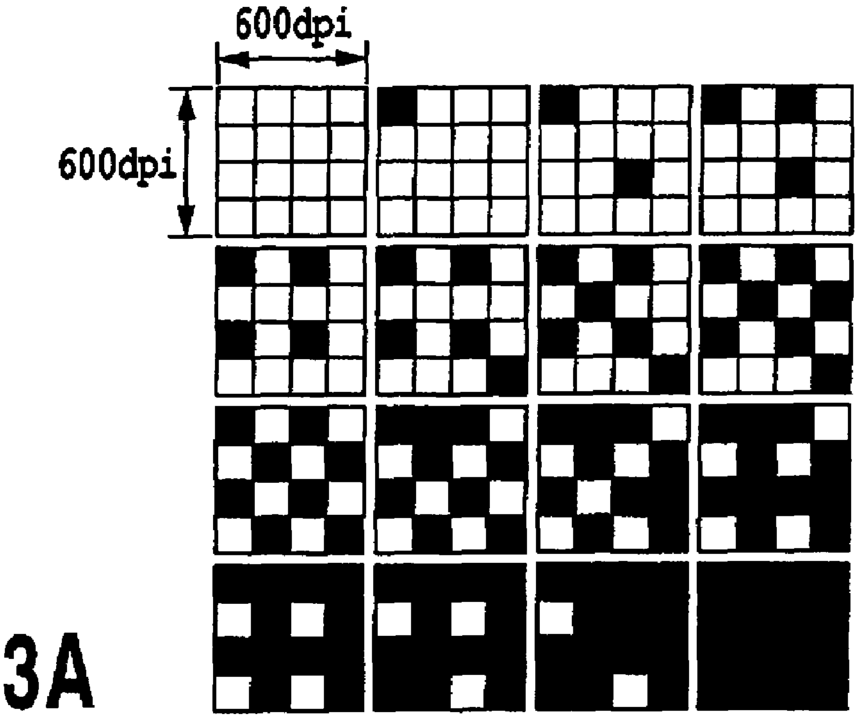
FIGS. 13A and 13B are schematic diagrams showing example 4×4 index patterns.
Figure 13B:
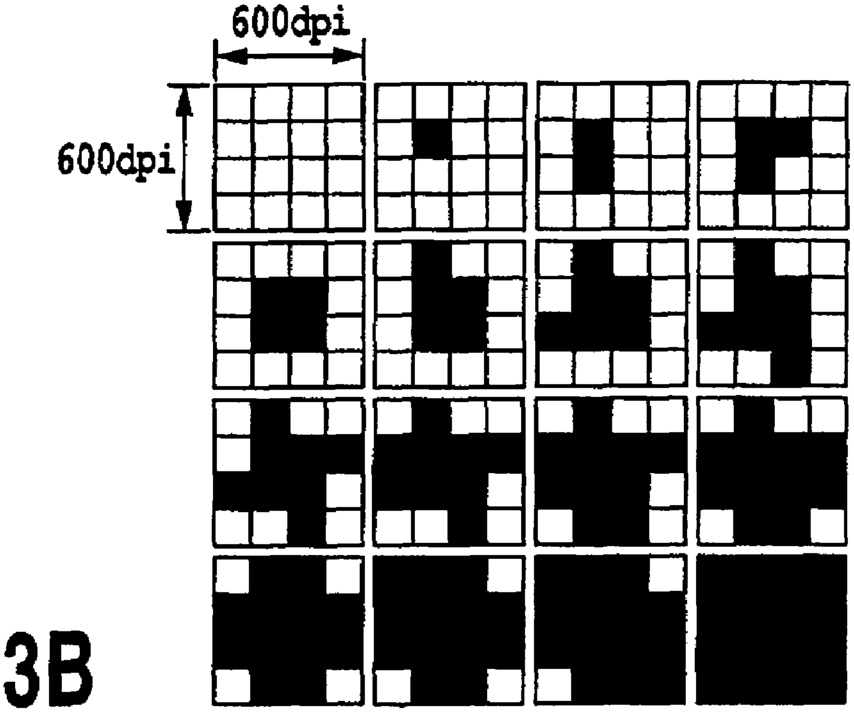

FIGS. 13A and 13B show example index patterns of 4×4 subpixels applicable to the third print mode in this embodiment. In both FIG. 13A and FIG. 13B, as the grayscale level increases, the number of subpixels or sectioned areas to be printed increases by one at a time. It is noted, however, that while in FIG. 13A the subpixels to be printed are relatively scattered for entire grayscale levels, those in FIG. 13B are kept concentrated.

Figure 14A:
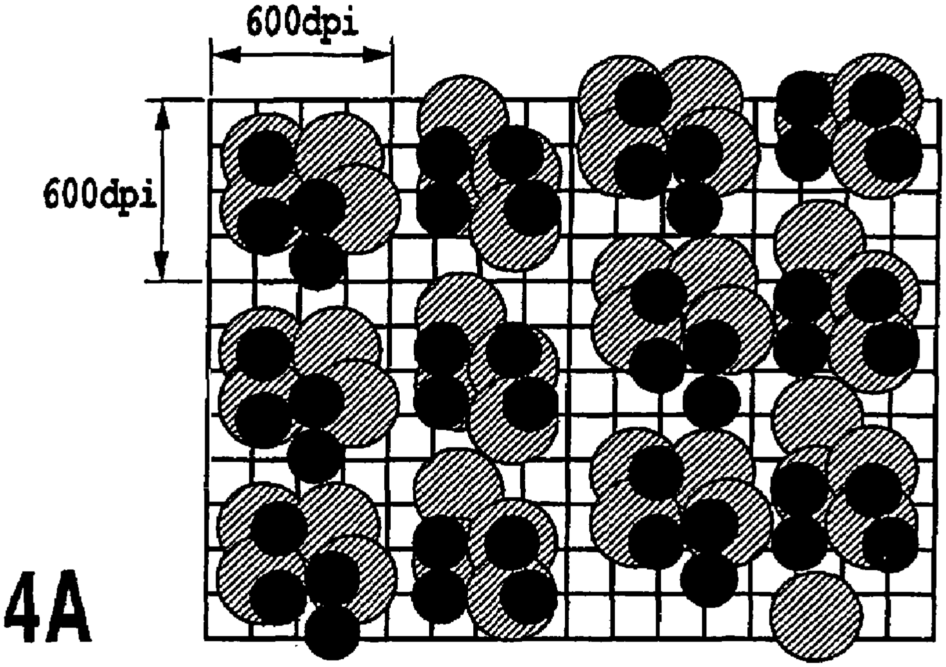
FIGS. 14A and 14B are schematic diagrams showing dot landing states.
Figure 14B:
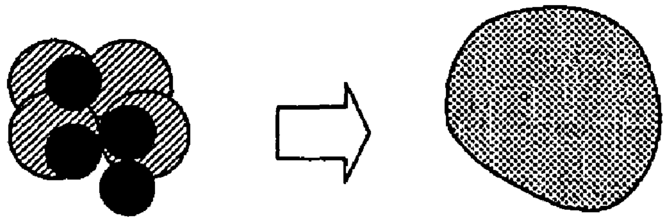

FIGS. 14A and 14B show dots formed by ejecting ink according to the index patterns of FIG. 13B. When such dot-concentrated index patterns are used, the satellites that deviate from the main dots not only overlap main dots at the corresponding positions in the adjoining pixel but also are contained in a group of main dots that exists close to them. Thus, even if the satellites deviate from their average positions for some reason, they likely remain contained in the groups of main dots. That is, as shown in FIG. 14B, if a satellite or a group of satellites slightly deviate, the shape of a large dot that is finally formed is not greatly affected.

The effect of index pattern such as shown in FIG. 13B can be produced whether the print medium is plain paper or dedicated paper that absorbs ink quickly. However, in a print medium, such as glossy paper, that has a relatively slow ink absorbing speed and thus allows dot outlines to appear clearly, the above index pattern produces a significant image quality improving effect. Further, in the intentionally formed, dot-concentrated mass, since the individual dots are kept from being dispersed randomly, blank areas can easily be formed, offering another advantage of being able to secure an intended tonality in high density portions.

When such a dot-concentrated index pattern is used to print an area where a monotonous tone spreads uniformly, similar dot-concentrated masses are parallelly and regularly arranged in the main scan direction. This makes errors in the subscan direction show up as variations. As a countermeasure for this problem, a method is known which arranges an index pattern at an angle to the main scan direction.

Figure 15A:
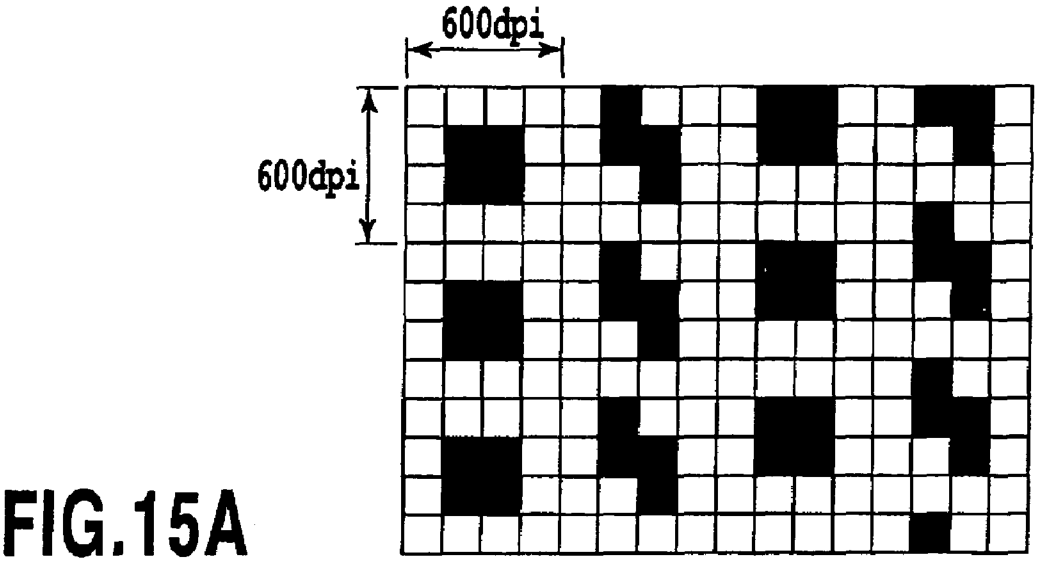
FIGS. 15A to 15C are schematic diagrams showing example arrangements of 4×4 index patterns applicable to the embodiment of this invention.
Figure 15B:
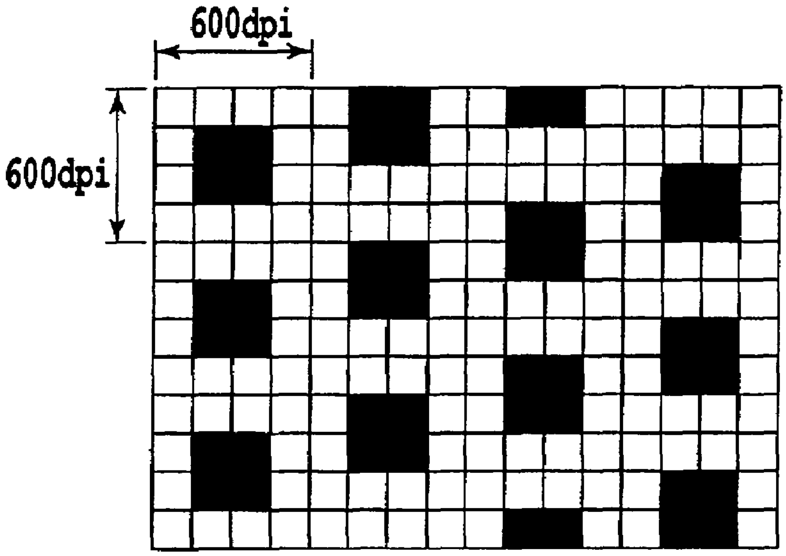
Figure 15C:
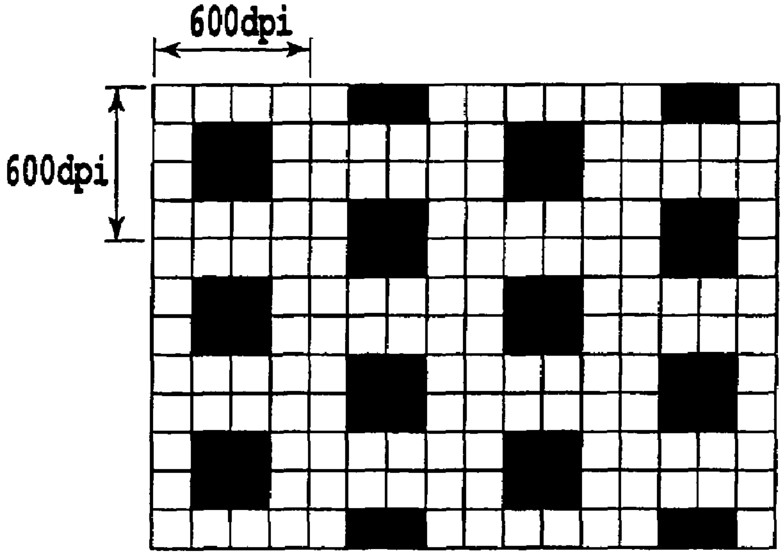

FIGS. 15A to 15C are schematic diagrams showing example arrangements of index patterns of 4×4 subpixels applicable to the third print mode in this embodiment. Here is shown a case where a grayscale level of 4/16 is represented by dot patterns. Individual index patterns are arranged at an angle to the main scan direction, with the dot-concentrated masses arranged at an increasing angle in the order of FIGS. 15A, 15B and 15C.

The effect of this invention of making satellites less distinguishable can be obtained also by using index patterns arranged at an angle. To confirm this, the inventors of this invention used the patterns of FIGS. 15A to 15C in the third print mode. It has been verified that the effect of this invention can be produced by any of these patterns. It is noted, however, that when the printing was done by arranging the patterns at an even larger angle, satellites deviating from main dots tended not to overlap main dot masses in an intended pixel, failing to fully produce a desired effect of this invention. Examinations by the inventors of this invention have found that the patterns should preferably be set at an angle of less than 45 degrees (FIG. 15C) or more preferably 30 degrees or less (FIGS. 15A and 15B).

Next, to further enhance the effect of this invention, a multipass printing method that incorporates a technique disclosed in Japanese Patent Application Laid-open No. 07-304216 will be explained.

Figures 16A, 16B, 16C, 16D, 16E:
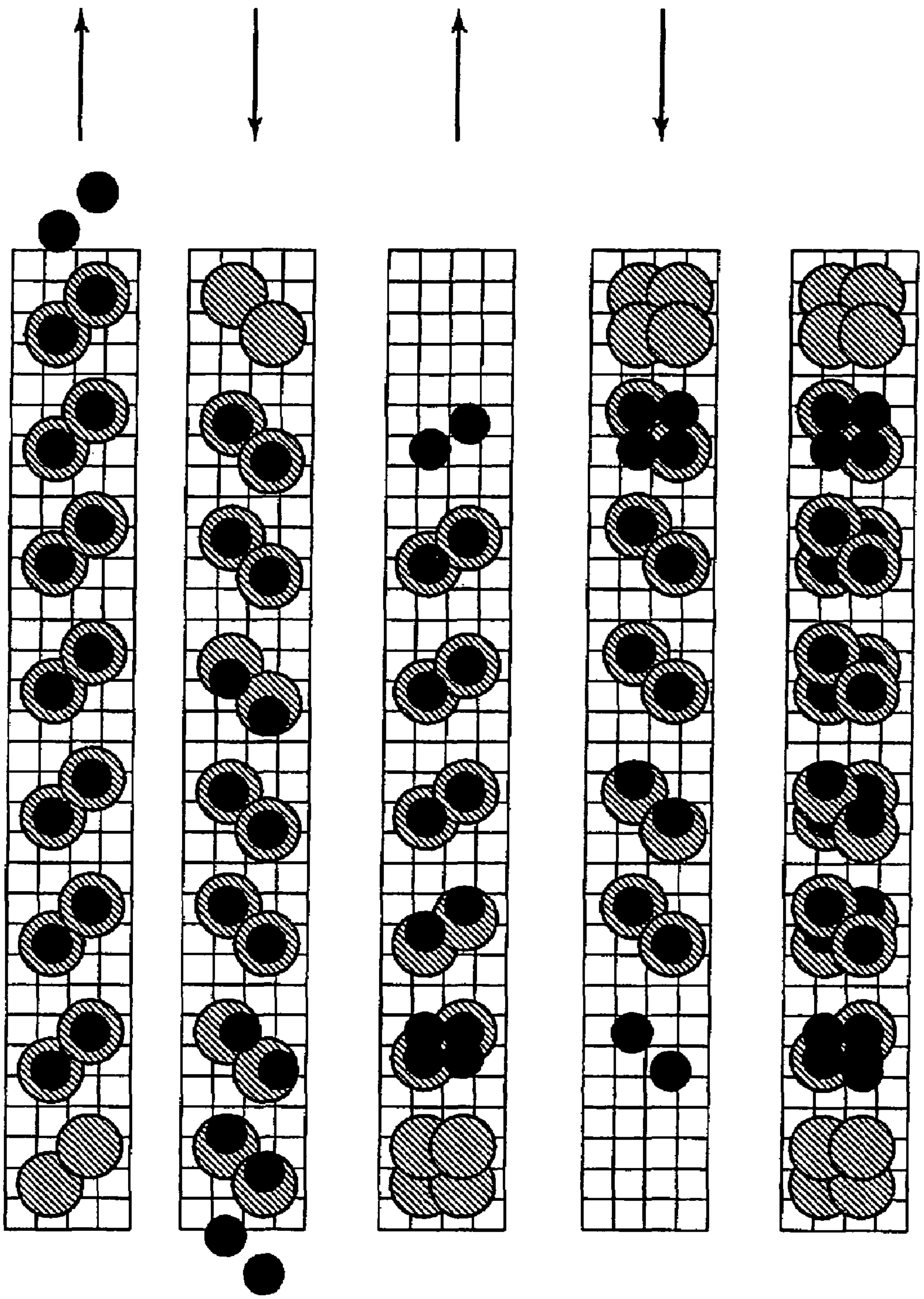
FIGS. 16A to 16E are schematic diagrams showing a multipass printing method applicable to the embodiment of this invention.

FIGS. 16A to 16E are schematic diagrams that explains a multipass printing method applicable to the third print mode of this embodiment. Here is shown a case where the index pattern of FIG. 13B is used to print a grayscale value of 4/16. In this example, four (2×2) print dots are divided diagonally in two and an image is formed by two printing scans, one in a forward direction and one in a backward direction. FIG. 16A represents dots formed by the forward scan and FIG. 16 represents dots formed by the backward scan. In FIG. 16A, satellites deviating from main dots are printed over main dots in a pixel adjoining the current pixel in the main scan direction. It is noted that satellites of the dots printed in the last pixel in the forward scan land on a blank portion outside the print area. In the backward printing scan, the similar phenomenon is observed, as shown in FIG. 16B. In an image formed by this multipass printing, satellites are observed at both ends of the print area, making the image less sharp.

To minimize such an image impairment, the method of this example performs a forward scan of FIG. 16C and a backward scan of FIG. 16D. This method is characterized in that, for the last pixel in each printing scan, data is not printed and that, for the first pixel, data is printed without being thinned. This printing method prevents satellites from being formed outside the ends of each printing scan. Thus, in a completed image, no satellites are observed at either end of the print area, as shown in FIG. 16E, producing a sharply defined image.

Figures 17A, 17B, 17C:
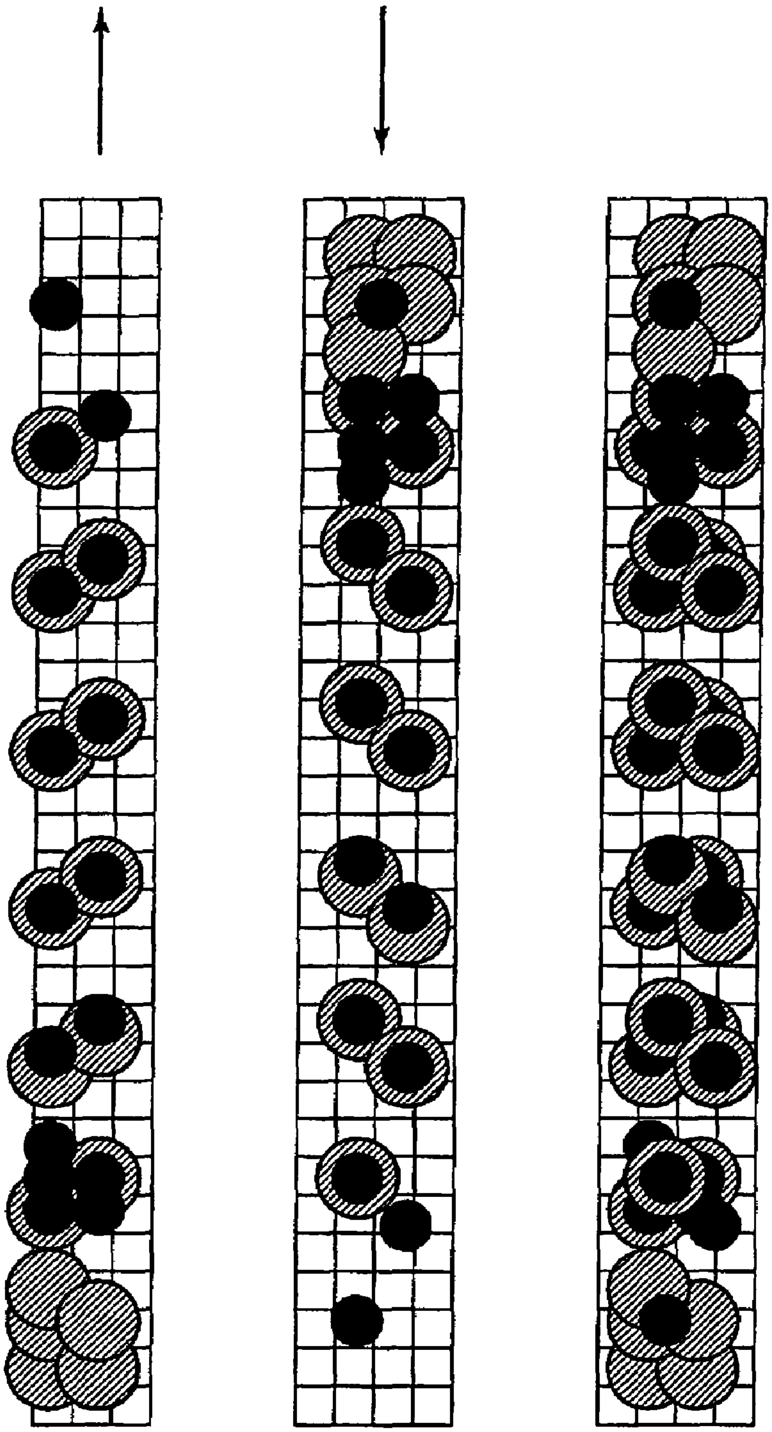
FIGS. 17A to 17C are schematic diagrams showing another multipass printing method applicable to the embodiment of this invention.

FIGS. 17A to 17C show a case where a grayscale level of 5/16 is printed by using the similar printing method to FIGS. 16A to 16E. Even at the grayscale level of 5/16 no satellites are observed at either end of a completed image, producing a highly crisp image.

Such an effect of this printing method is not just produced at the ends of the print medium. Image impairments caused by satellites landing outside the boundaries can occur at both ends of any object that requires continuous ink ejection operations. Thus, if it is possible to extract pixels making up an outline of the object and execute the characteristic printing control described above on these pixels, the present invention can be realized more effectively.

Although in FIGS. 16A-16E and FIGS. 17A-17C all pixel data is printed in the first pixel in the main scan and none is printed in the last pixel, this embodiment is not limited to this method. For example, in the first pixel in the main scan a print duty may be set higher than other pixels and, in the last pixel, set lower than other pixels. This can also produce the similar effect, though to a different degree.

Although the two-pass bidirectional printing has been described here as an example of the multipass printing method, the effect of the above printing method can also be produced for three or more passes as long as the multipass printing is bidirectional. Further, there is no problem if the number of passes and the direction of printing vary according to the print mode. The use of the multipass printing method that incorporates the technology of Japanese Patent Application Laid-open No. 07-304216 does not limit the present invention. While the printing method described with reference to FIGS. 16A-16E and FIGS. 17A-17C enhances the effect of this invention, it is possible, without using such a printing method, to produce the effect of this invention of making the satellites formed deviated from main dots less distinguishable.

While the above explanation has been made by using the print head of FIG. 11, this embodiment employs such a print head for each of a plurality of colors. In this case, an index pattern and image processing may be provided for each ink color independently even in the same print mode. Further, the effect of this invention does not change at all if the invention is applied to a configuration that, in addition to the four colors of FIG. 1, uses red, blue and green inks or light inks for these colors.

While explanations have been given to four example print modes with different ejection volumes and different distances to paper, the printing apparatus of this embodiment may of course have a greater number of print modes. For example, a print mode may be provided that executes a printing operation using a fast moving carriage in order to produce an output in a shorter time. In this case, as explained in FIG. 8, the distance between main dots and satellites is affected by a change in the carriage speed. So, an index pattern that matches the carriage speed change should preferably be prepared.

As described above, in the ink jet printing apparatus having a plurality of print modes with different ejection volumes, different distances to paper and different carriage speeds, this embodiment can produce a crisp image with satellites rendered hardly recognizable in any print mode by preparing index patterns of different sizes for different print modes.

OTHER EMBODIMENTS

Although in the above embodiment the distance between landing positions of main dots and satellites in each print mode is set to an integer times the width of an index pattern, some degree of the effect of this invention can be expected even if this distance is not set exactly to an integer multiple of the index pattern width but set close to that value. That is, if the distance is set nearly to an integer times the width of an index pattern the effect of this invention can be expected. This, however, may produce a moire on a printed image, so the integer multiple is a desirable condition.

Further, the present invention can effectively be applied to a full line type print head of a length corresponding to the maximum width of a print medium that the printing apparatus can print. Such a print head may have a construction in which the required length can be realized by a combination of multiple print heads or a construction of a single, integrally formed print head. In the case of the full line type print head, the transport speed of print medium corresponds to the carriage speed of the above embodiment.

As shown in the block diagram of FIG. 3, the above embodiment has been described as a printing system in which the data conversion associated with the image processing is executed by the image processing unit 116 provided outside the printer unit 117. This invention, however, is not limited to this configuration and includes a configuration in which a part or all of the process shown in FIG. 4 and FIG. 12 may be processed in the printer unit and also a printing system in which all necessary devices are equipped in the printing apparatus, as in the case of copying machines or facsimiles.

Further, the ink jet print head is not limited to a construction using electrothermal transducers, such as shown in FIG. 2. In a printing system where satellites tend to deviate from main droplets, this invention can effectively work also in other print head constructions, such as those employing a piezoelectric system and an electrostatic system. The construction explained with reference to FIG. 2 is particularly effective for an ink jet printing system that can be realized relatively easily at low cost and with high resolution.

As described above, in any of print modes that have different distances between main droplets and satellites because of differences among the print modes in ejection volume, distance to paper and carriage speed, this invention can cause satellites to land on printed positions of main droplets. Therefore, the invention can prevent image impairments that would otherwise be caused by the satellites, thus producing a crisp image.

The present invention has been described in detail with respect to preferred embodiments, and it will now be apparent from the foregoing to those skilled in the art that changes and modifications may be made without departing from the invention in its broader aspects, and it is the intention, therefore, that the appended claims cover all such changes and modifications.

This application claims priority from Japanese Patent Application No. 2005-167408 filed Jun. 7, 2005, which is hereby incorporated by reference herein.

What is claimed is:

1. An ink jet printing system which uses a print head having a plurality of ink ejecting nozzles to form an image on a print medium that is moved relative to the print head, the ink jet printing system comprising:

means for setting one of a plurality of print modes;

means for converting multivalued image data into grayscale data of a predetermined resolution and level according to the set print mode;

means for selecting one of index patterns according to the print mode and the grayscale data, each of the index patterns having a plurality of sectioned areas corresponding to one pixel of a printing resolution of the print head, the areas being arrayed in at least the direction of relative movement, and predetermined print/non-print binary data being set in each of the sectioned areas to represent a density in an area corresponding to one pixel of the predetermined resolution; and means for ejecting ink from the nozzles toward the print medium according to the index pattern selected by the selection means, wherein the ink ejected from the nozzles is divided into a main droplet and a sub droplet following the main droplet, and wherein the number of sectioned areas arrayed in the index pattern in the direction of relative movement is so determined that the main droplet and the sub droplet land on the print medium, spaced a distance almost equal to an integer times a width, in the direction of relative movement, of the area corresponding to one pixel of the predetermined resolution.

2. An ink jet printing system according to claim 1, wherein a main scan to eject ink from the nozzles as the print head is scanned over the print medium and a subscan to feed the print medium in a direction crossing the main scan are repetitively alternated to form an image on the print medium, and wherein the plurality of print modes differ from one another in at least one of an ink ejection volume, a moving speed of the print head during the main scan, and a distance between nozzle openings and the print medium.

3. An ink jet printing system according to claim 2, wherein an image is completed by a plurality of forward and backward main scans over a predetermined area of the print medium to complement print data, wherein the number of ejections to a starting end pixel of continuous print data is set greater than the number of ejections to inner pixels of the continuous print data, and wherein the number of ejections to a terminating end pixel of the continuous print data is set less than the number of ejections to the inner pixels of the continuous print data.

4. An ink jet printing system according to claim 1, wherein the print head has the nozzles arrayed in a plurality of rows spanning a print width of the print medium, and wherein an image is formed by ejecting ink from the nozzles as the print medium is transported in a direction crossing the nozzle array direction.

5. An ink jet printing system according to claim 1, wherein the index pattern is so arranged that as the level of the grayscale data increases, the number of sectioned areas to be printed with a dot increases from the inside of the index pattern toward the outside.

6. An ink jet printing system according to claim 1, wherein each of the nozzles ejects ink by thermal energy generated by an electrothermal transducer in the nozzle.

7. An ink jet printing system according to claim 1, wherein the selecting means selects one of index patterns to represent an area corresponding to one pixel of the predetermined resolution using series of a unit pixel corresponding to one pixel of a printing resolution.

* * * * *